(12) United States Patent
Berger et al.

(10) Patent No.: US 12,323,241 B2
(45) Date of Patent: Jun. 3, 2025

(54) SEPARATE PREDICTIONS FOR VIDEO COMPRESSION FOR XR

(71) Applicant: QUALCOMM Incorporated, San Diego, CA (US)

(72) Inventors: Peer Berger, Hod Hasharon (IL); Shay Landis, Hod Hasharon (IL); Matan Guetta, Kiryat Ono (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/361,645

(22) Filed: Jul. 28, 2023

(65) Prior Publication Data

US 2025/0038885 A1    Jan. 30, 2025

(51) Int. Cl.
    *H04L 1/00*            (2006.01)
    *H04N 19/503*       (2014.01)
    *H04N 19/65*         (2014.01)
    *H04N 19/89*         (2014.01)

(52) U.S. Cl.
    CPC ......... *H04L 1/0061* (2013.01); *H04N 19/503* (2014.11); *H04N 19/65* (2014.11); *H04N 19/89* (2014.11)

(58) Field of Classification Search
    CPC .... H04L 1/0061; H04N 19/503; H04N 19/65; H04N 19/89
    USPC ........................................................ 714/776
    See application file for complete search history.

(56) References Cited

U.S. PATENT DOCUMENTS

| | | | |
|---|---|---|---|
| 10,887,616 B2 * | 1/2021 | Jun ...................... | H04N 19/176 |
| 11,051,153 B1 * | 6/2021 | Aljohani ........... | H03M 13/6306 |
| 2005/0071725 A1 * | 3/2005 | Gibart ................... | H04L 1/0083 |
| | | | 714/755 |
| 2007/0168819 A1 * | 7/2007 | Buhe ...................... | H04R 1/005 |
| | | | 714/746 |
| 2009/0268809 A1 * | 10/2009 | Cordara ................. | H04N 19/89 |
| | | | 375/E7.246 |
| 2011/0022916 A1 * | 1/2011 | Desai .................... | H04L 9/3239 |
| | | | 380/46 |
| 2020/0177902 A1 * | 6/2020 | Jun ......................... | H04N 19/50 |
| 2021/0135784 A1 * | 5/2021 | Robert Safavi ....... | H04L 1/0061 |
| 2023/0087517 A1 * | 3/2023 | Oikawa ............. | H03M 13/6312 |
| | | | 714/807 |
| 2024/0267057 A1 * | 8/2024 | Lee ................... | H03M 13/2906 |

* cited by examiner

*Primary Examiner* — James C Kerveros
(74) *Attorney, Agent, or Firm* — QUALCOMM Incorporated

(57) ABSTRACT

Method and apparatus for compression in wireless communication systems. The apparatus compresses a signal based on an encoder scheme, wherein an encoded signal comprises at least a first CRC associated with a prediction index and a second CRC associated with a prediction information component. The apparatus transmits, to a second wireless device, the encoded signal comprising at least the first CRC associated with the prediction index and the second CRC associated with the prediction information component. The apparatus may be configured to compress the signal such that the signal comprises one or more parity bits, where the one or more parity bits correspond to a difference between a frame of the signal and at least one subsequent frame of the signal.

28 Claims, 16 Drawing Sheets

SEPARATE PREDICTIONS FOR VIDEO COMPRESSION FOR XR

TECHNICAL FIELD

The present disclosure relates generally to communication systems, and more particularly, to a configuration for compression in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus compresses a signal based on an encoder scheme, wherein an encoded signal comprises at least a first cyclic redundancy check (CRC) associated with a prediction index and a second CRC associated with a prediction information component. The apparatus transmits, to a second wireless device, the encoded signal comprising at least the first CRC associated with the prediction index and the second CRC associated with the prediction information component.

In an aspect of the disclosure, a method, a computer-readable medium, and an apparatus are provided. The apparatus may be a device at a network node. The device may be a processor and/or a modem at a network node or the network node itself. The apparatus receives, from a first wireless device, a compressed signal based on an encoder scheme, wherein an encoded signal comprises at least a first CRC associated with a prediction index and a second CRC associated with a prediction information component. The apparatus estimates the prediction information component, missing from a decoded signal derived from the compressed signal, based on the prediction index in response to a CRC fail of the second CRC and a CRC pass of the first CRC.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
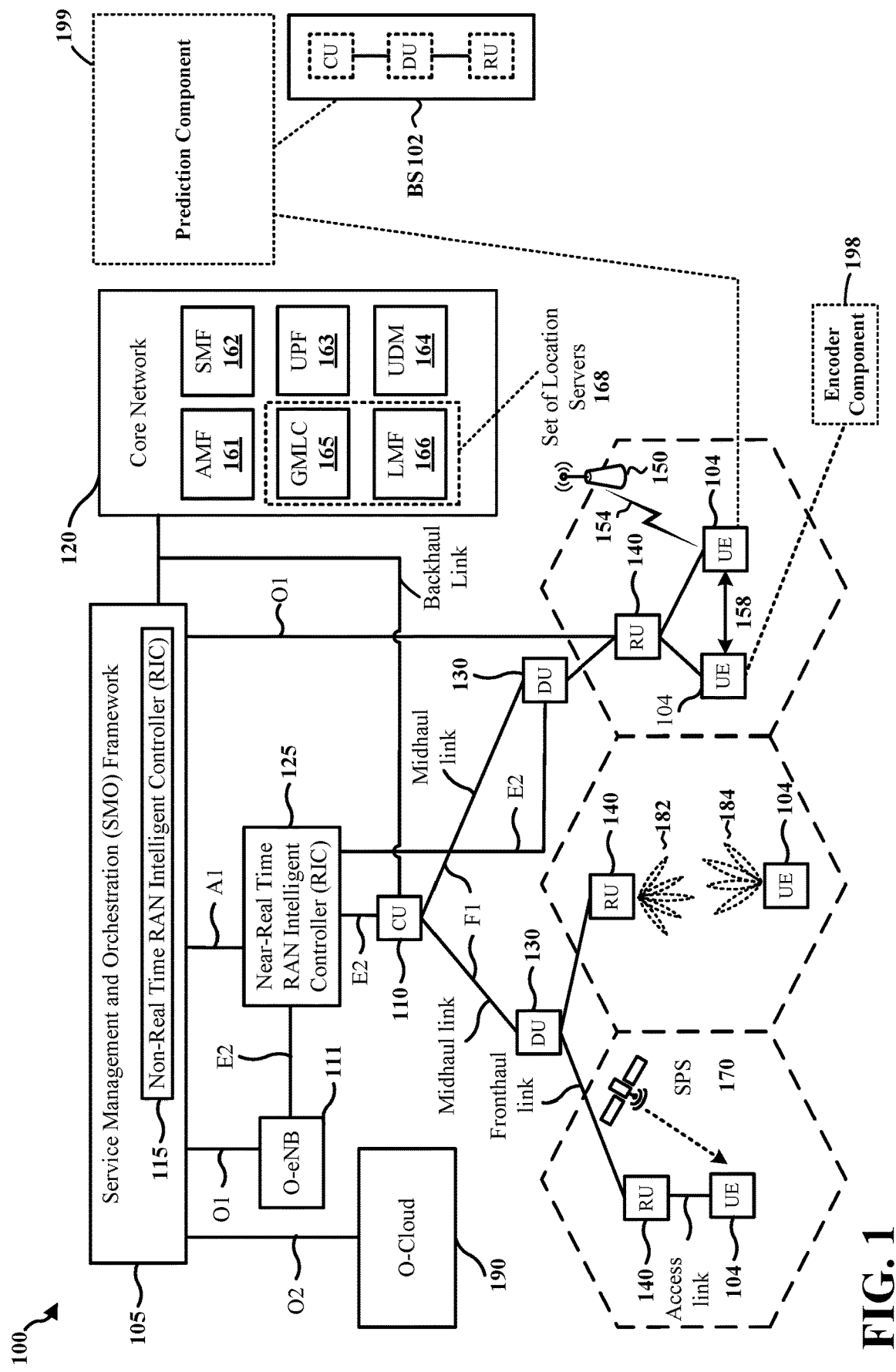
FIG. 1 is a diagram illustrating an example of a wireless communications system and an access network.

The popularity of virtual reality (VR), augmented reality (AR), and mixed reality (MR) technologies is growing at a fast pace and may be widely adopted for applications other than gaming. There is an increase demand for XR devices (e.g., XR goggles or headsets) having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

XR communications may utilize a scheme that may be based on lossy information and lossy compression, due in part to XR communications being comprised of real-time video and not static data. Different encoding schemes may be used for compression, but compression may be based on predictions and the difference from the prediction information. As such, there is a different importance level between the prediction and the difference from the prediction information.

Aspects presented herein provide a configuration for separate predictions for video compression in XR. For example, a scheme may be utilized that is configured to improve video quality based on a CRC indication of a separate prediction index CRC. The separate CRC associated to the prediction index signaling, even in instances where not all of the data is conveyed correctly, may be utilized to estimate missing data that was not properly received.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise an encoder component 198 that may be configured to compress a signal based on an encoder scheme, wherein an encoded signal comprises at least a first CRC associated with a prediction index and a second CRC associated with a prediction information component; and transmit, to a second wireless device, the encoded signal comprising at least the first CRC associated with the prediction index and the second CRC associated with the prediction information component.

Referring again to FIG. 1, in certain aspects, the base station 102 or the UE 104 may comprise a prediction component 199 that may be configured to receive, from a first wireless device, a compressed signal based on an encoder scheme, wherein an encoded signal comprises at least a first CRC associated with a prediction index and a second CRC associated with a prediction information component; and estimating the prediction information component, missing from a decoded signal derived from the compressed signal, based on the prediction index in response to a CRC fail of the second CRC and a CRC pass of the first CRC.

Although the following description may be focused on 5G NR, the concepts described herein may be applicable to other similar areas, such as LTE, LTE-A, CDMA, GSM, and other wireless technologies.

Figure 2:
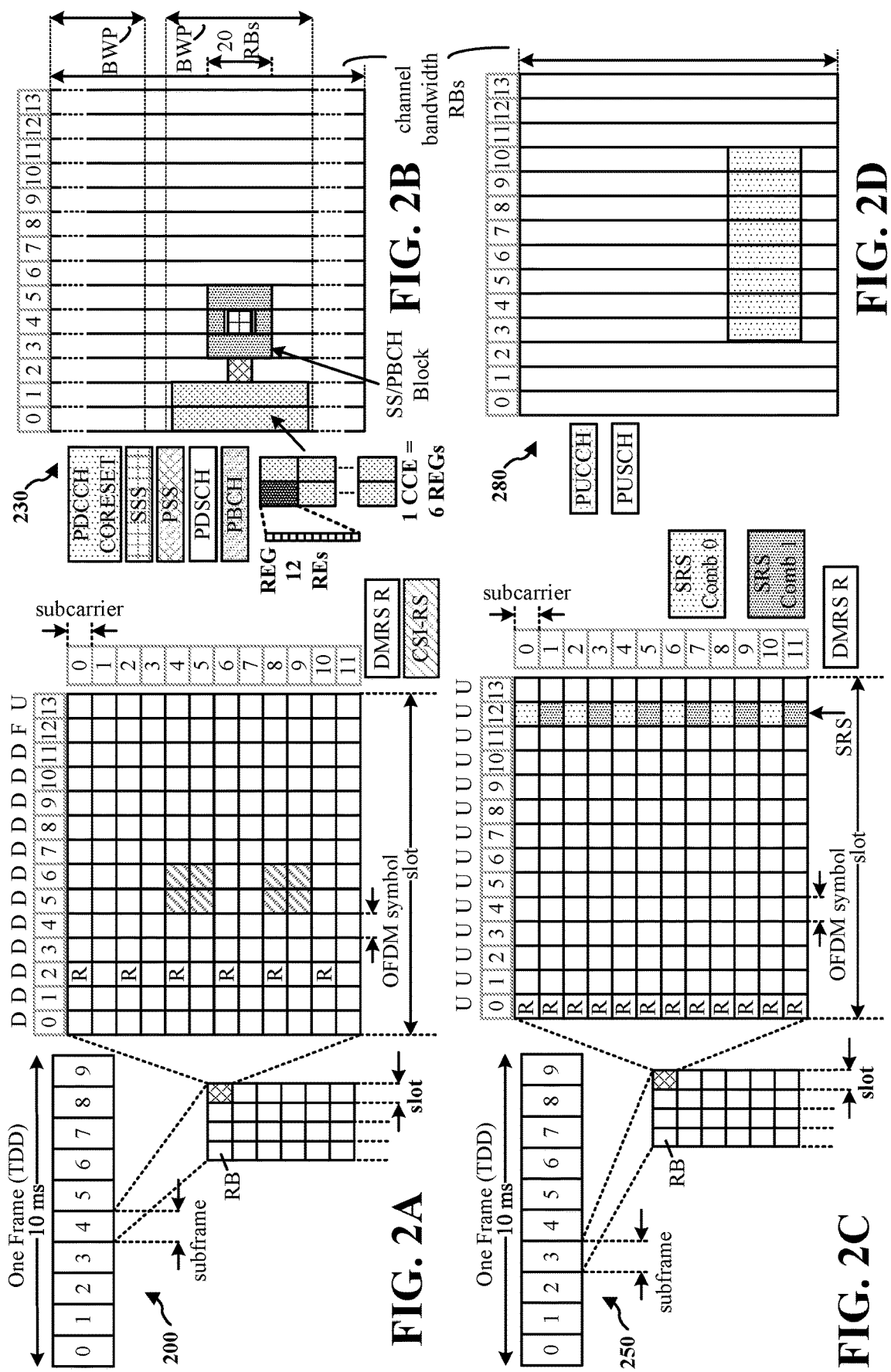
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu*15$ kHz, where μ is the numerology 0 to 4. As such, the numerology p=0 has a subcarrier spacing of 15 kHz and the numerology p=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
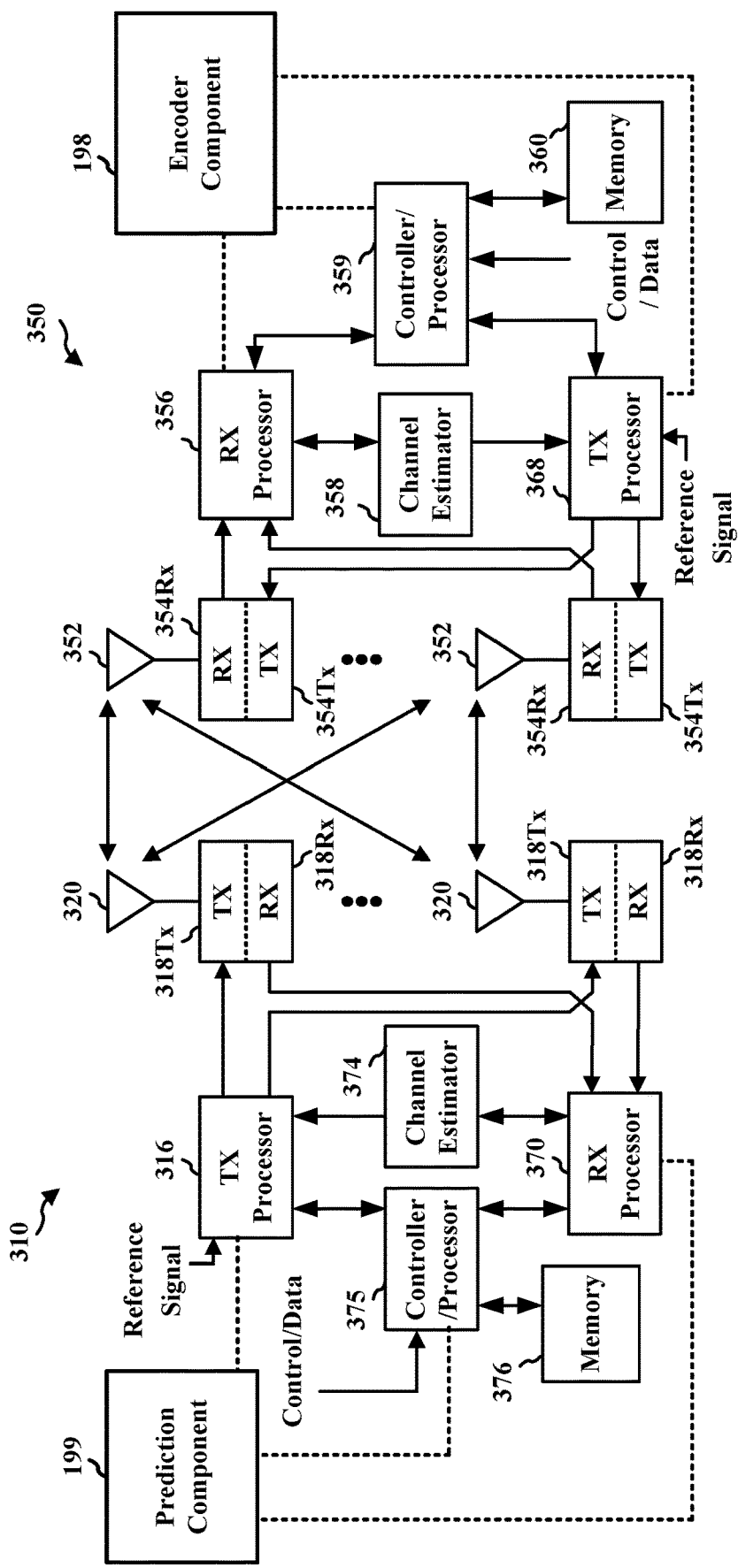
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the encoder component 198 of FIG. 1.

At least one of the TX processor 316, the RX processor 370, and the controller/processor 375 may be configured to perform aspects in connection with the prediction component 199 of FIG. 1.

XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 4B:
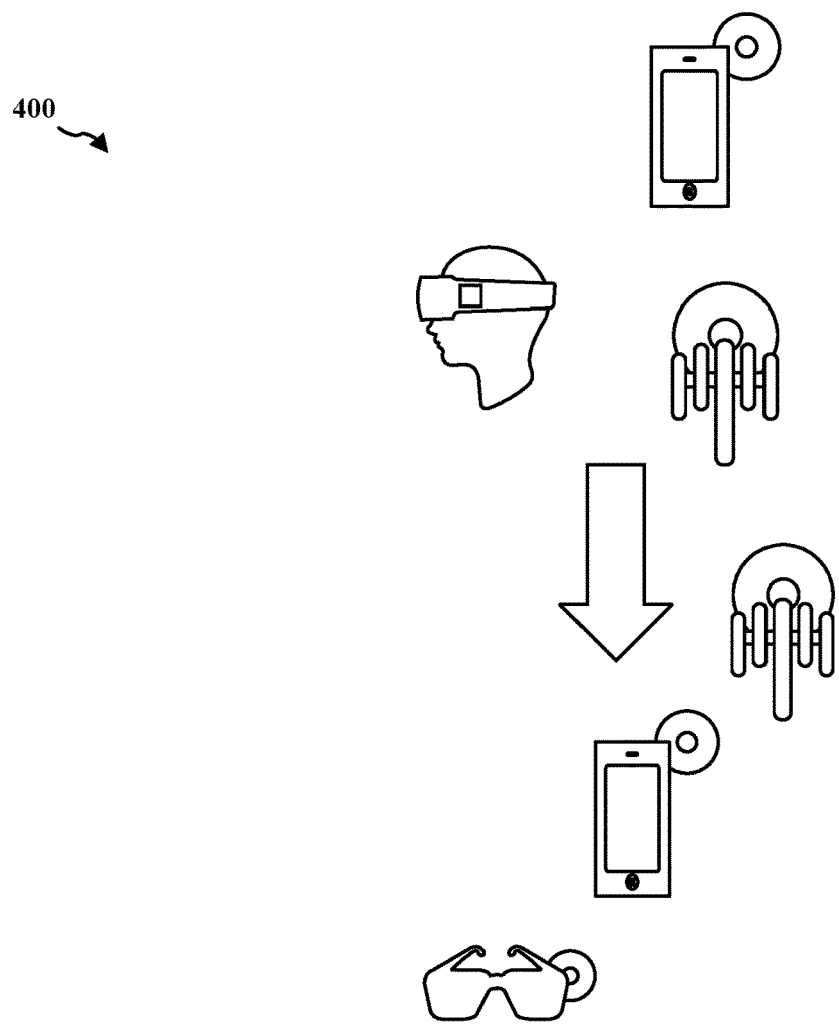
FIG. 4B is a diagram of wireless communications of XR devices.
Figure 4A:
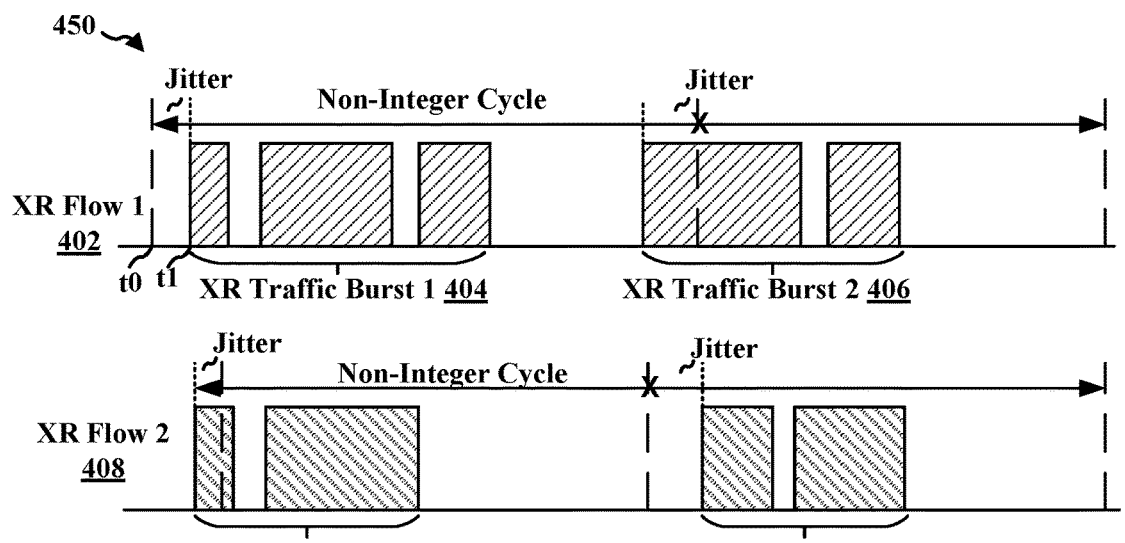
FIG. 4A is a diagram illustrating aspects of XR communication.

XR traffic may arrive in periodic traffic bursts ("XR traffic bursts"). An XR traffic burst may vary in a number of packets per burst and/or a size of each pack in the burst. FIG. 4A includes a diagram 450 illustrating a first XR flow 402 that includes a first XR traffic burst 404 and a second XR traffic burst 406. As illustrated in the diagram 450, the traffic bursts may include different numbers of packets, e.g., the first XR traffic burst 404 being shown with three packets (represented as rectangles in the diagram 450) and the second XR traffic burst 406 being shown with two packets. Furthermore, as illustrated in the diagram 450, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $\frac{1}{60}$=16.67 ms periods. In another example, for 120 FPS video data, XR traffic bursts may arrive in $\frac{1}{120}$=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 450 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

The popularity of VR, AR, and MR technologies is growing at a fast pace and may be widely adopted for applications other than gaming, such as but not limited to healthcare, education, social, retail, and many more. There is an increase demand for XR devices (e.g., XR goggles or headsets), as shown for example in diagram 400 of FIG. 4B, having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

Video encoders, such as H.264, H.265, or the like, operate on the basis of breaking each frame of a video (e.g., image) into sub-regions and then for each sub-region, the encoder may try several hypotheses (e.g., predictions) and the encoder may select the best or optimal hypothesis based on video quality and compression. The hypotheses may perform predictions in various formats. For example, some predictions may be based on adjacent pixels, temporal predictions based on images in time, and the like.

Figure 5A:
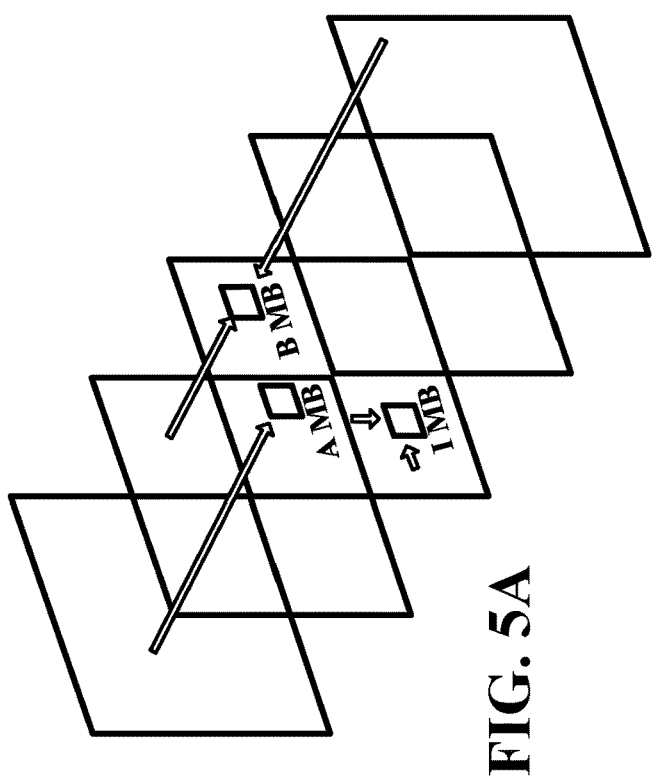
FIGS. 5A-5B is a diagram illustrating an example of a prediction scheme.
Figure 5B:
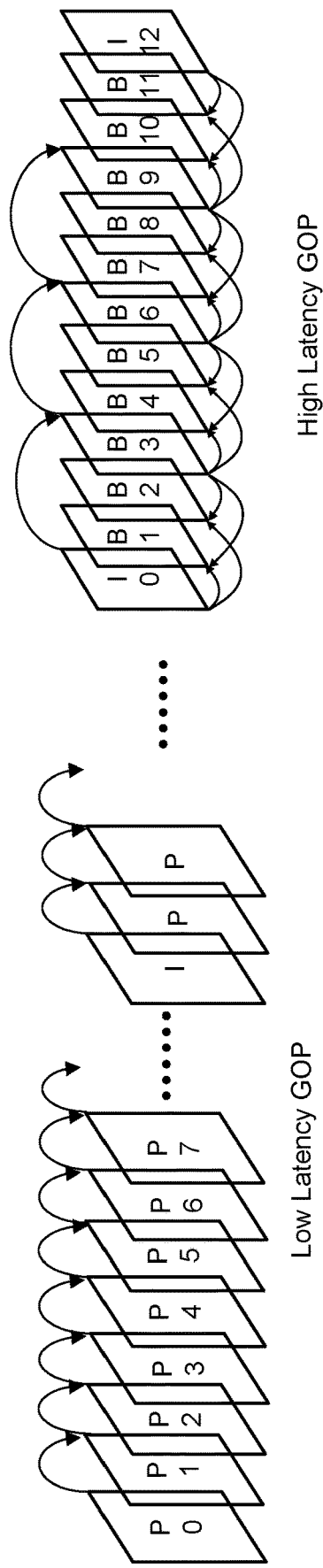

FIGS. 5A and 5B provide an example of a macroblock prediction. Macroblock (MB) prediction may include three types of predictions, as shown in diagram 500 of FIG. 5A. For example, an I MB prediction is a prediction based on intra-prediction from neighboring samples in a current frame. A P MB prediction is a prediction based on samples in a previously-coded frame. A B MB prediction is a prediction based on samples in a previously-coded frame and from following frames. An order in which the I, P, and B frames are arranged may be known as a group of pictures (GOP), as shown for example in diagram 510 of FIG. 5B.

Figure 6A:
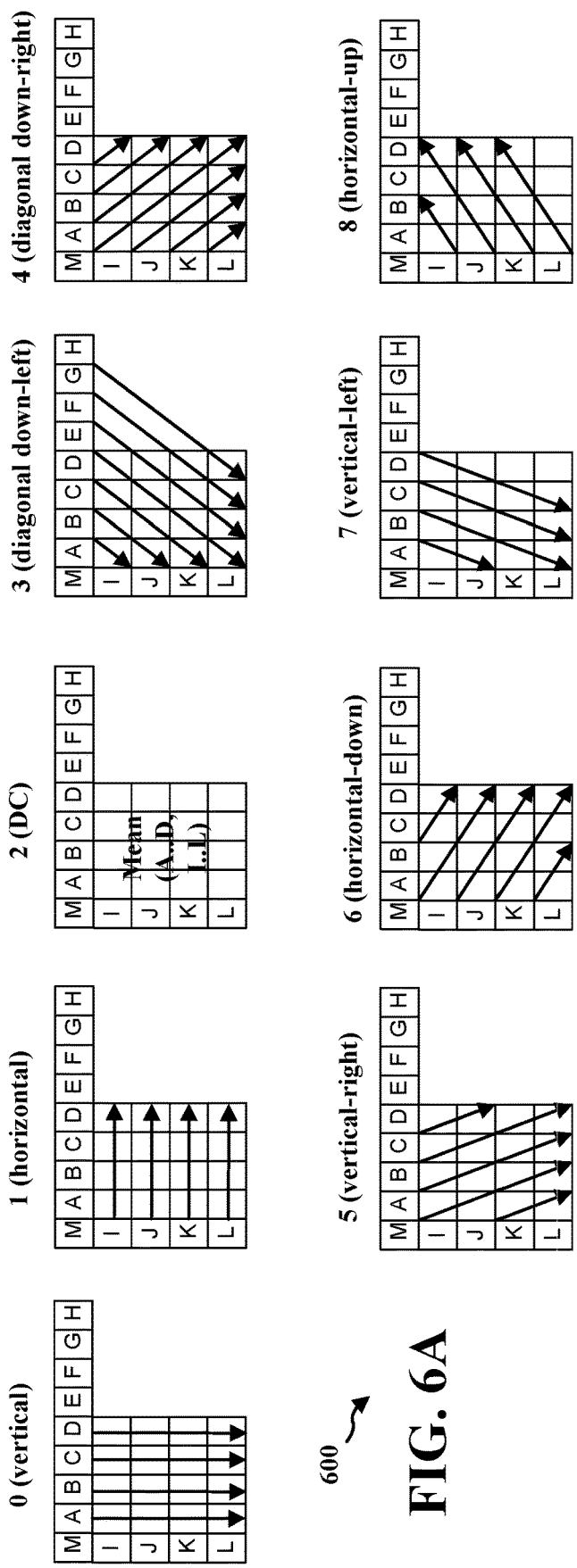
FIGS. 6A-6B is a diagram illustrating an example of a prediction scheme.
Figure 6B:
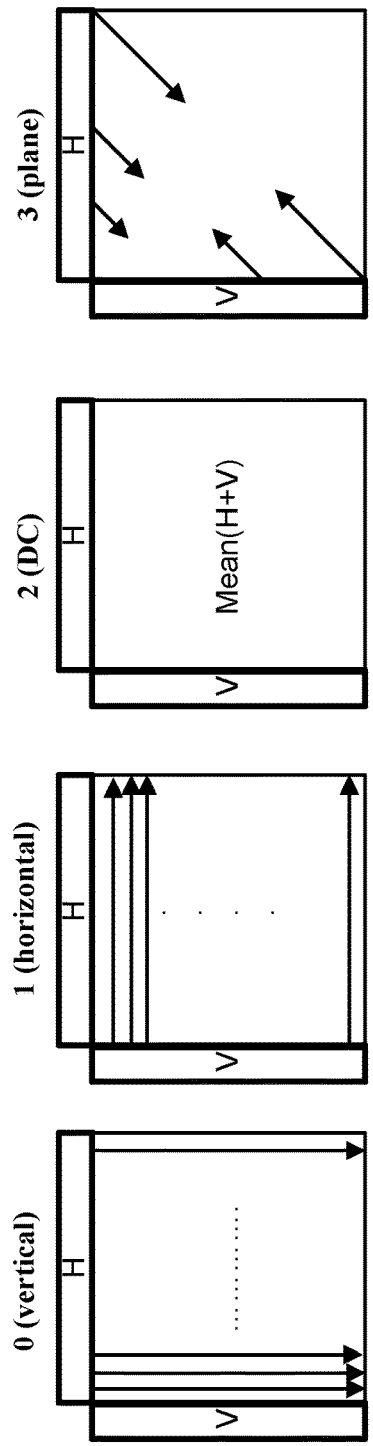

FIGS. 6A and 6B provide an example of an intra (e.g., spatial) prediction. Intra predictions may use different block sizes (e.g., 16×16, 8×8, 4×4) to predict a macroblock from the surrounding previously-coded pixels within the same frame. For a typical block of luma or chroma samples, there may be a correlation between samples in the block and samples that are immediately adjacent to the block, as shown for example in diagram 600 of FIG. 6A or diagram 610 of FIG. 6B. The examples shown in diagram 600 of FIG. 6A include examples of 4×4 intra prediction modes, while the examples shown in diagram 610 of FIG. 6B include examples of 16×16 prediction modes.

Figure 7:
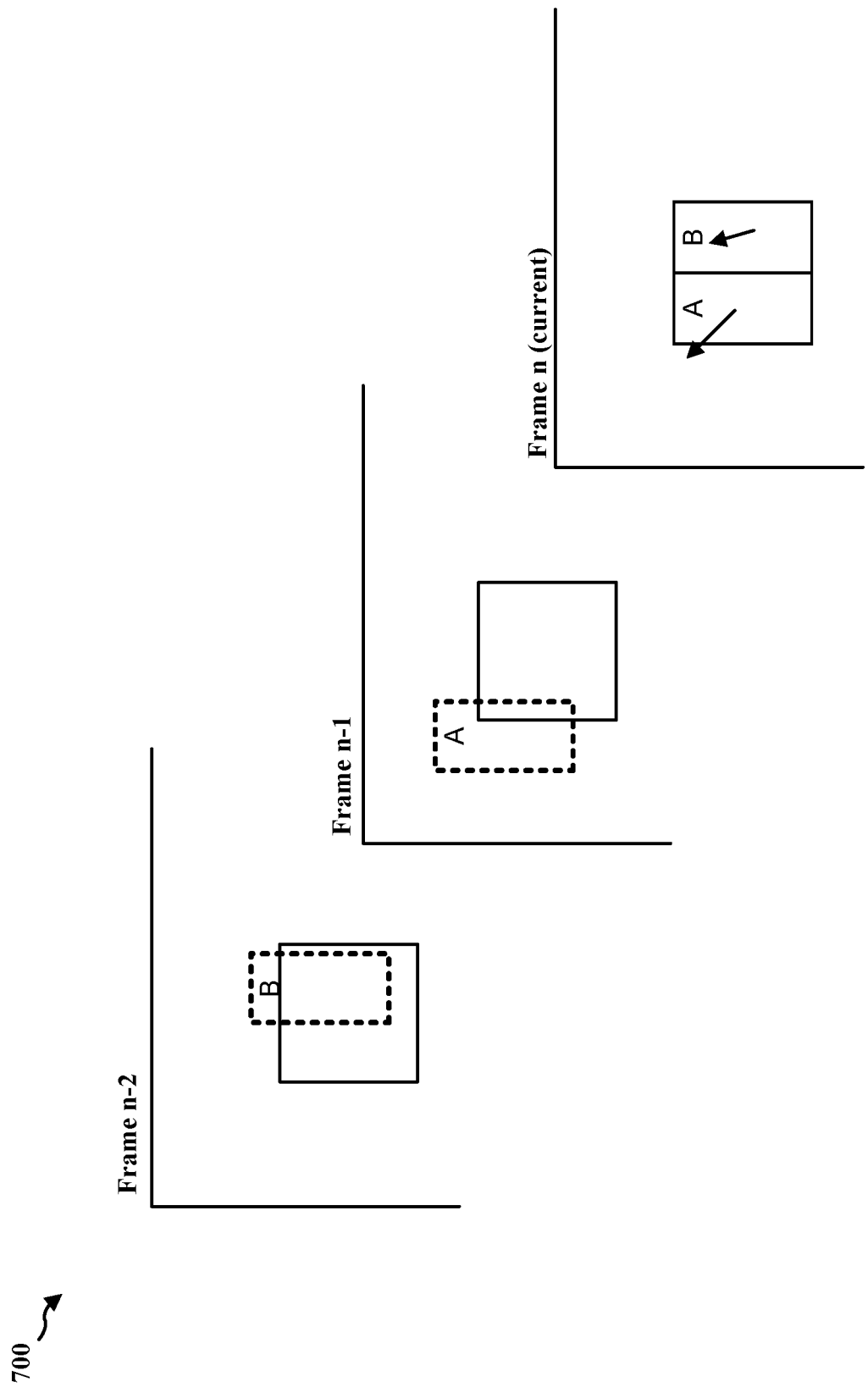
FIG. 7 is a diagram illustrating an example of a prediction scheme.

FIG. 7 provides a diagram 700 of inter (e.g., temporal) prediction. Inter prediction is a process of predicting a block of luma and chroma samples from an image that has previously been coded and transmitted (e.g., a reference image). Inter prediction may comprise selection of a prediction region (e.g., search space), generation of a prediction block, subtraction of the prediction block from the original block of samples to form a residual, and coding and transmission of the residual block. The reference image may be selected from a list of previously coded images, stored in a decoded picture buffer, which may include images before and after the current image in display order. An offset between the position of the current partition and the prediction region in the reference image may be known as a motion vector. In some instances, the offset between two macroblocks and the motion vector may have a ¼ pixel resolution for the luma component and a ⅛ pixel resolution for the chroma component. The luma (Y) and chroma (Cr, Cb) samples at sub-pixel positions do not exist in the reference image(s) and are created using interpolation from nearby image samples.

These predictions are tried in the encoder and the encoder selects the best prediction and then prepares two components that include information related to the prediction. For example, the first indication includes the prediction, and the second indication includes the difference between the prediction and the actual image.

Figure 8:
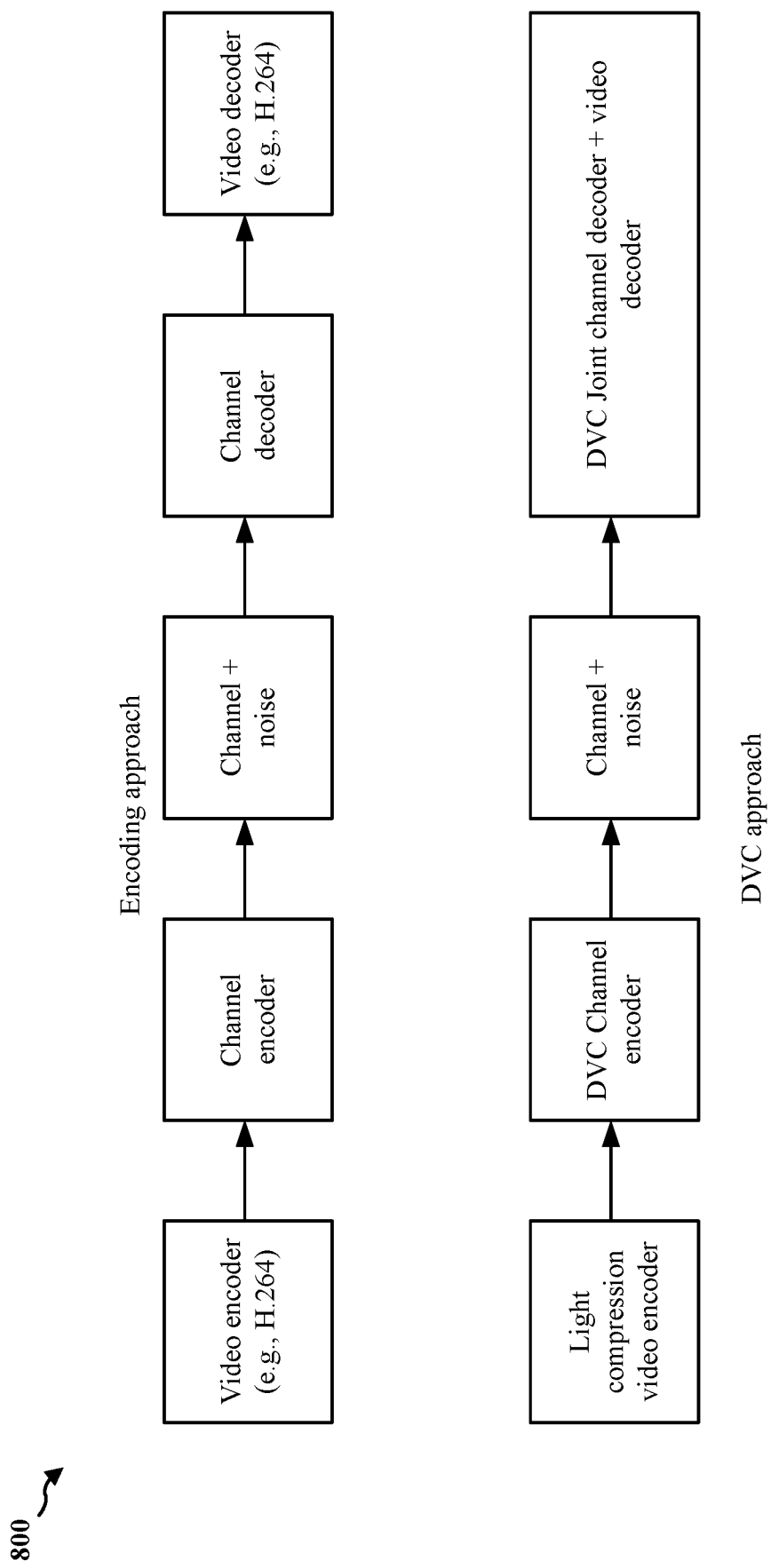
FIG. 8 is a diagram of a distributed video coding scheme.

In some instances, such as in distributed video coding (DVC), the video encoder may be a complex component for an XR device, such that the video encoder has a high power consumption, or may introduce latency such that there is a tradeoff between compression ratio and latency. In DVC, the complexity of the video encoding may be performed by the video decoder. For example, video decoding may be performed at a receiver. With reference to diagram 800 of FIG. 8, a conventional approach may include a transmitter encoding a video at a video encoder, a channel encoding at a channel encoder, transmission of the encoded channel plus noise, decoding of the channel at a channel decoder of a receiver, and then decoding of the encoded channel at a video decoder at the receiver. In a DVC approach, a transmitter may perform light compression at a video encoder, a DVC channel encoding at a DVC channel encoder, transmission of the encoded channel plus noise to the receiver where joint communication and video decoding is performed at a DVC joint channel decoder and video decoder of the receiver.

Figure 9:
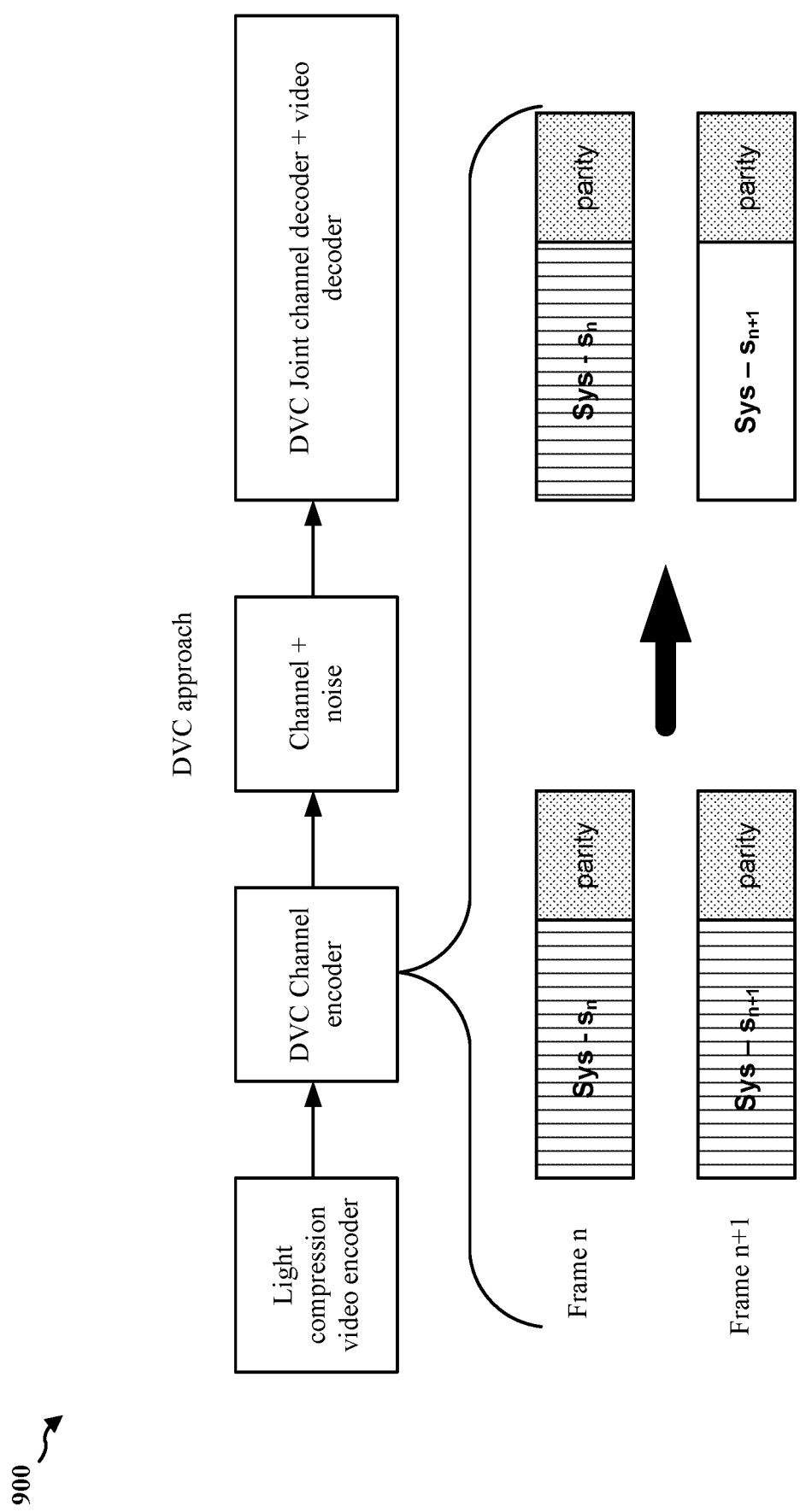
FIG. 9 is a diagram of a distributed video coding scheme.

With reference to diagram 900 of FIG. 9, a frame n is encoded using an error protecting code, such that parity bits are generated and transmitted to a receiver, such that the receiver may utilize the parity bits to decode the encoded data. The receiver may perform a CRC check on the received parity bits and if a CRC pass occurs, then the receiver properly received the parity bits. In DVC, with regards to sending the next frame (e.g., frame n+1), instead of sending all the information (e.g., systematic bits and parity bits), it can be assumed that the adjacent frame is very close to the previous frame, such that only the parity bits are transmitted based under the assumption at the receiver that the systematic bits are the same as the previous frame (e.g., frame n). In some instances, the transmitter may transmit some of the systematic bits in addition to the parity bits, while in some instances, the transmitter may not transmit any of the systematic bits but may, at most, transmit at least some of the parity bits. Channel conditions and the dynamic features of the video may determine whether systematic bits and/or parity bits are transmitted. For example, for static video, less systematic bits and less parity bits may be transmitted due in part to the static nature of the video resulting in favorable channel conditions which may allow for less parity bits being transmitted. The image within the frame may have changed between frame n and frame n+1, but if the difference is not significant, then the error correcting code may treat those differences as errors, and use the parity bits to recover the entirety of the frame (e.g., frame n+1). As such, a subset of the data may be utilized to recover the frame without transmission of the entirety of the next frame (e.g., frame n+1), which may reduce overhead.

XR communications may utilize a scheme that may be based on lossy information and lossy compression, due in part to XR communications being comprised of real-time video and not static data. Different encoding schemes may be used for compression, but compression may be based on predictions and the difference from the prediction information. As such, there is a different importance level between the prediction and the difference from the prediction information. In some instances, there may also be different levels within the difference from the prediction information.

Aspects presented herein provide a configuration for separate predictions for video compression in XR. For example, a scheme may be utilized that is configured to improve video quality based on a CRC indication of a separate prediction index CRC. The separate CRC associated to the prediction index signaling, even in instances where not all of the data is conveyed correctly, may be utilized to estimate missing data that was not properly received. At least one advantage of the disclosure is that a separate CRC for a prediction index may allow for an improved estimation of missing data which may improve video quality.

In some instances, a separate CRC for the prediction index, along with a separate CRC for the data, may be utilized in an effort to improve video quality. The separate CRCs may be within different code blocks or may be within the same code block. In some instances, the CRC associated with the prediction index and the CRC associated with the data (e.g., prediction information) may be comprised in a distributed CRC, where CRC bits may protect part of the code block. For example, a first CRC corresponding to a first portion of the distributed CRC may provide protection for a first portion of a code block comprising the prediction index, and a second CRC corresponding to a second portion of the distributed CRC may provide protection for a second portion of the code block comprising the prediction information component. In some aspects, such as but not limited to unequal error protection (UEP) scheme, the prediction index may have increased protection over that of the prediction information component (e.g., difference from the prediction information). If the difference from prediction information part ($\Delta$) of the message was not properly received, leading to a CRC fail, but the prediction index was received properly, leading to a CRC pass, then interpolation or extrapolation may be utilized based on the prediction (e.g. adjacent pixels spatially in the same frame/the same pixels in different frames). The message may be separated at the video encoder such that the prediction is chosen in order to minimize $\Delta$=message−prediction. If the prediction is known, due to a CRC pass, and assume that $\Delta \neq$message−prediction, due to a CRC fail of not properly receiving the message, then the message may be estimated as message=f(prediction), instead of message=prediction+$\Delta$. Thus, getting a CRC fail for the CRC associated with the prediction information while obtaining a CRC pass for the CRC associated with the prediction index may allow the receiver to obtain an improved estimate of the missing data based in part on other frames (e.g., previous, current, or subsequent).

In some instances, the separate CRC for the prediction index may be utilized to improve video quality when a DVC scheme is used. For example, a separate CRC for the prediction index, along with a separate CRC for the data, may be utilized in an effort to improve video quality. The separate CRCs may be within different code blocks or may be within the same code block, as discussed herein. In DVC, the decoder at a receiver may be initialed with a prediction, and the transmitter may send only parity bits corresponding to CRC bits of the prediction index. The decoder may attempt to recover the message under the assumption that the prediction is close enough to the message and does not comprise many errors. The prediction may be based on previous messages in conjunction with the CRC of the prediction index (e.g., a part of the light compression, and not to be mistaken with the decoder prediction). Instances may be addressed where the receiver did not get a CRC pass for previous messages, but did get a CRC pass on the prediction index, which may decrease error propagation. At least one advantage of the disclosure is the separate CRCs may lead to an enhanced prediction which may lead to an improved video quality.

Figure 10:
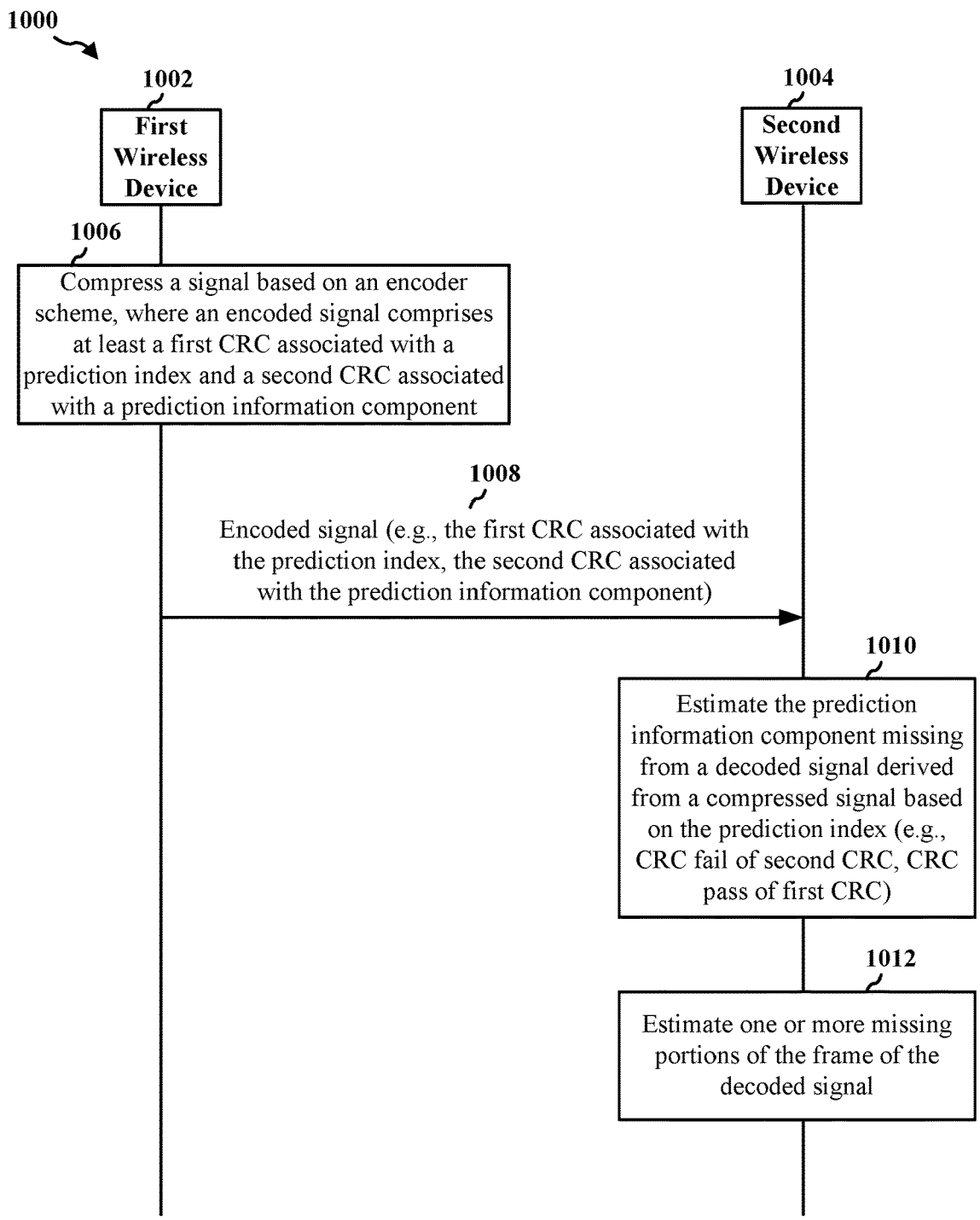
FIG. 10 is a call flow diagram of signaling between a first wireless device and a second wireless device.

FIG. 10 is a call flow diagram 1000 of signaling between a first wireless device 1002 and a second wireless device 1004. The first wireless device 1002 may be configured to communicate with the second wireless device 1004. For example, in the context of FIG. 1, the second wireless device 1004 may correspond to base station 102 or the UE 104 and the first wireless device 1002 may correspond to at least UE 104. In another example, in the context of FIG. 3, the second wireless device 1004 may correspond to base station 310 and the first wireless device 1002 may correspond to UE 350. In some aspects, the first wireless device 1002 may comprise an XR device (e.g., goggles, headset) or a UE, where the second wireless device may comprise a UE or a base station, such that the XR device (e.g., first wireless device) may communicate with the UE/base station (e.g., second wireless device).

At 1006, the first wireless device 1002 may compress a signal based on an encoder scheme. The first wireless device compressing the signal based on the encoder scheme may generate an encoded signal. The encoded signal may comprise at least a first CRC associated with a prediction index and a second CRC associated with a prediction information component. In some aspects, the prediction index may identify a prediction scheme utilized in the encoder scheme. The prediction information component may correspond to a difference between a frame of the encoded signal and a prediction of the frame of the encoded signal. In some aspects, the first CRC associated with the prediction index may be in a different code block than the second CRC associated with the prediction information component. In some aspects, the first CRC associated with the prediction index may be in a same code block of the second CRC associated with the prediction information component. In some aspects, the first CRC and the second CRC may be comprised in a distributed CRC. The first CRC corresponding to a first portion of the distributed CRC may provide protection for a first portion of a code block comprising the prediction index. The second CRC corresponding to a second portion of the distributed CRC may provide protection for a second portion of the code block comprising the prediction information component. In some aspects, the encoded signal may comprise one or more parity bits. The one or more parity bits may correspond to a difference between a frame of the encoded signal and at least one subsequent frame of the encoded signal. In some aspects, the encoder scheme utilized to compress the encoded signal may comprise a distributed video coding (DVC) scheme.

At 1008, the first wireless device 1002 may transmit the encoded signal to the second wireless device 1004. The second wireless device 1004 may receive the compressed signal derived from the encoded signal from the first wireless device 1002. The compressed signal may comprise at least the first CRC associated with the prediction index and the second CRC associated with the prediction information component.

At 1010, the second wireless device 1004 may predict the prediction information component, missing from a decoded signal derived from the compressed signal, based on the prediction index. The second wireless device may predict the prediction information component, missing from the decoded signal derived from the compressed signal, based on the prediction index in response to a CRC fail of the second CRC and a CRC pass of the first CRC. In some aspects, the prediction index may identify a prediction scheme utilized in the encoder scheme. The prediction information component may correspond to a difference between a frame of the compressed signal and a prediction of the frame of the compressed signal.

At 1012, the second wireless device may estimate one or more missing portions of the frame from the decoded signal. In some aspects, the second wireless device may estimate one or more missing portions of a frame of the decoded signal. based on previous frames and current positions from a present frame having the CRC pass for at least the second CRC or both the first CRC and the second CRC. In some aspects, the second wireless device may estimate one or more missing portions of the frame of the decoded signal based on the compressed signal based on subsequent frames in response to receipt of the CRC fail for the second CRC. In such aspects, the compressed signal, received from the first wireless device, may comprise one or more parity bits. The one or more parity bits may correspond to a difference between a frame of the compressed signal and at least one subsequent frame of the compressed signal. In some aspects, the encoder scheme utilized to generate the compressed signal may comprise a distributed video coding (DVC) scheme.

Figure 11:
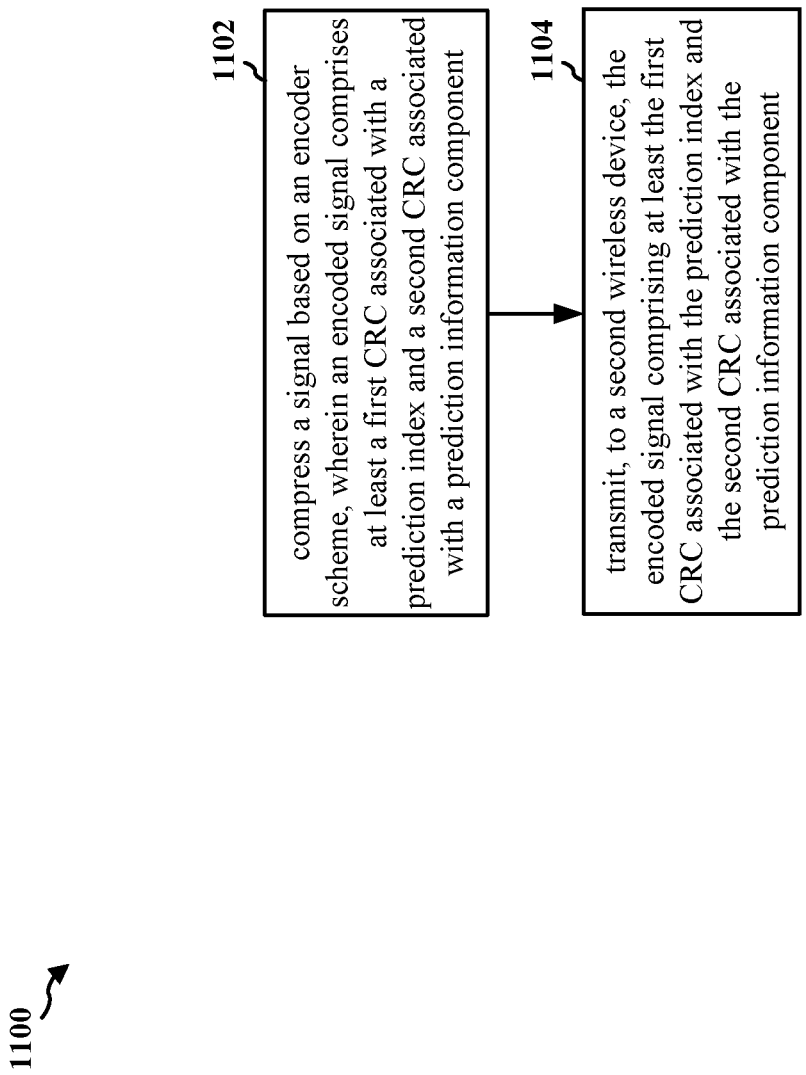
FIG. 11 is a flowchart of a method of wireless communication.

FIG. 11 is a flowchart 1100 of a method of wireless communication at a first wireless device. The method may be performed by a UE (e.g., the UE 104; the apparatus 1204). One or more of the illustrated operations may be omitted, transposed, or contemporaneous. The method may allow for an improved estimation of missing data based at least on a separate CRC for a prediction index.

At 1102, the first wireless device may compress a signal based on an encoder scheme. For example, 1102 may be performed by encoder component 198 of apparatus 1204. The first wireless device compressing the signal based on the encoder scheme may generate an encoded signal. The encoded signal may comprise at least a first CRC associated with a prediction index and a second CRC associated with a prediction information component. In some aspects, the prediction index may identify a prediction scheme utilized in the encoder scheme. The prediction information component may correspond to a difference between a frame of the encoded signal and a prediction of the frame of the encoded signal. In some aspects, the first CRC associated with the prediction index may be in a different code block than the second CRC associated with the prediction information component. In some aspects, the first CRC associated with the prediction index may be in a same code block of the second CRC associated with the prediction information component. In some aspects, the first CRC and the second CRC may be comprised in a distributed CRC. The first CRC corresponding to a first portion of the distributed CRC may provide protection for a first portion of a code block comprising the prediction index. The second CRC corresponding to a second portion of the distributed CRC may provide protection for a second portion of the code block comprising the prediction information component. In some aspects, the encoded signal may comprise one or more parity bits. The one or more parity bits may correspond to a difference between a frame of the encoded signal and at least one subsequent frame of the encoded signal. In some aspects, the encoder scheme utilized to compress the encoded signal may comprise a DVC scheme.

At 1104, the first wireless device may transmit the encoded signal. For example, 1104 may be performed by encoder component 198 of apparatus 1204. The first wireless device may transmit the encoded signal to a second wireless device. The encoded signal may comprise at least the first CRC associated with the prediction index and the second CRC associated with the prediction information component.

Figure 12:
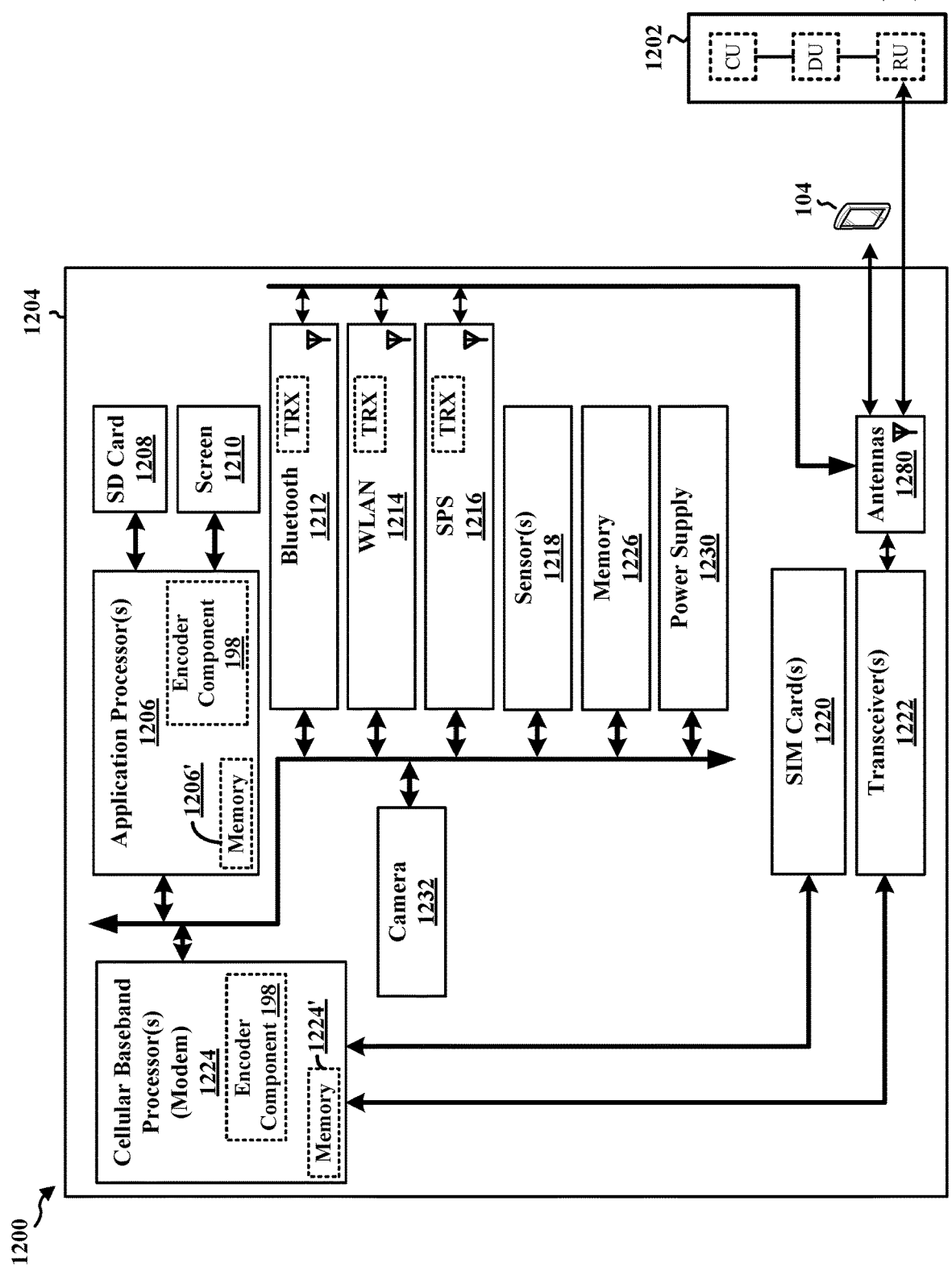
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SO-NAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the component 198 may be configured to compress a signal based on an encoder scheme, wherein an encoded signal comprises at least a first CRC associated with a prediction index and a second CRC associated with a prediction information component; and transmit, to a second wireless device, the encoded signal comprising at least the first CRC associated with the prediction index and the second CRC associated with the prediction information component. The component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for compressing a signal based on an encoder scheme, wherein an encoded signal comprises at least a first CRC associated with a prediction index and a second CRC associated with a prediction information component. The apparatus includes means for transmitting, to a second wireless device, the encoded signal comprising at least the first CRC associated with the prediction index and the second CRC associated with the prediction information component. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
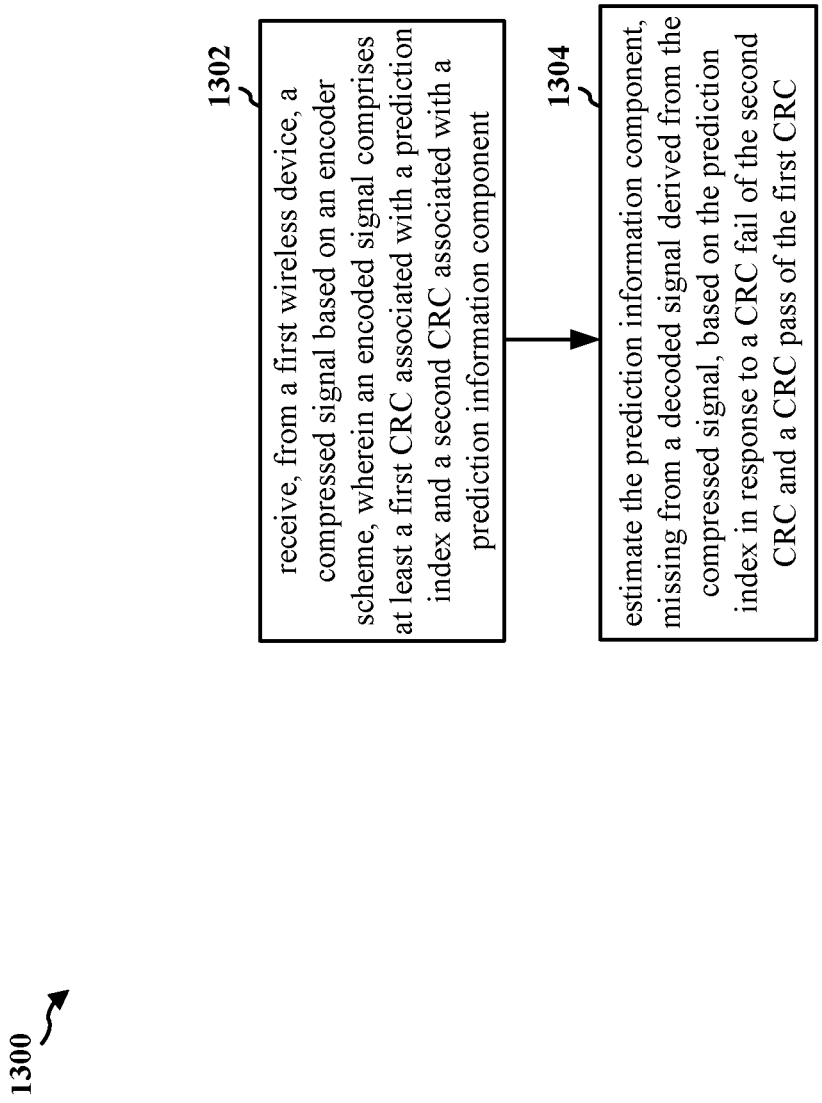
FIG. 13 is a flowchart of a method of wireless communication.

FIG. 13 is a flowchart 1300 of a method of wireless communication at a second wireless device. The method may be performed by a UE (e.g., the UE 104; the apparatus 1504) or may be performed by a network entity (e.g., the base station 102; the network entity 1502, 1602). One or more of the illustrated operations may be omitted, transposed, or contemporaneous. The method may allow for an improved estimation of missing data based at least on a separate CRC for a prediction index.

At 1302, the second wireless device may receive, from a first wireless device, a compressed signal. For example, 1302 may be performed by prediction component 199 of apparatus 1504 or network entity 1502, 1602. The compressed signal may be compressed based on an encoder scheme. The compressed signal may be compressed by the first wireless device based on the encoder scheme to generate an encoded signal. The encoded signal may comprise at least a first CRC associated with a prediction index and a second CRC associated with a prediction information component. In some aspects, the first CRC associated with the prediction index may be in a different code block than the second CRC associated with the prediction information component. In some aspects, the first CRC associated with the prediction index may be in a same code block of the second CRC associated with the prediction information component. In some aspects, the first CRC and the second CRC may be comprised in a distributed CRC. The first CRC corresponding to a first portion of the distributed CRC may provide protection for a first portion of a code block comprising the prediction index. The second CRC corresponding to a second portion of the distributed CRC may provide protection for a second portion of the code block comprising the prediction information component.

At 1304, the second wireless device may estimate the prediction information component, missing from a decoded signal derived from the compressed signal, based on the prediction index. For example, 1304 may be performed by prediction component 199 of apparatus 1504 or network entity 1502, 1602. The second wireless device may estimate the prediction information component, missing from the decoded signal derived from the compressed signal, based on the prediction index in response to a CRC fail of the second CRC and a CRC pass of the first CRC. In some aspects, the prediction index may identify a prediction scheme utilized by the first wireless device in the encoder scheme. The prediction information component may correspond to a difference between a frame of the encoded signal and a prediction of the frame of the encoded signal.

Figure 14:
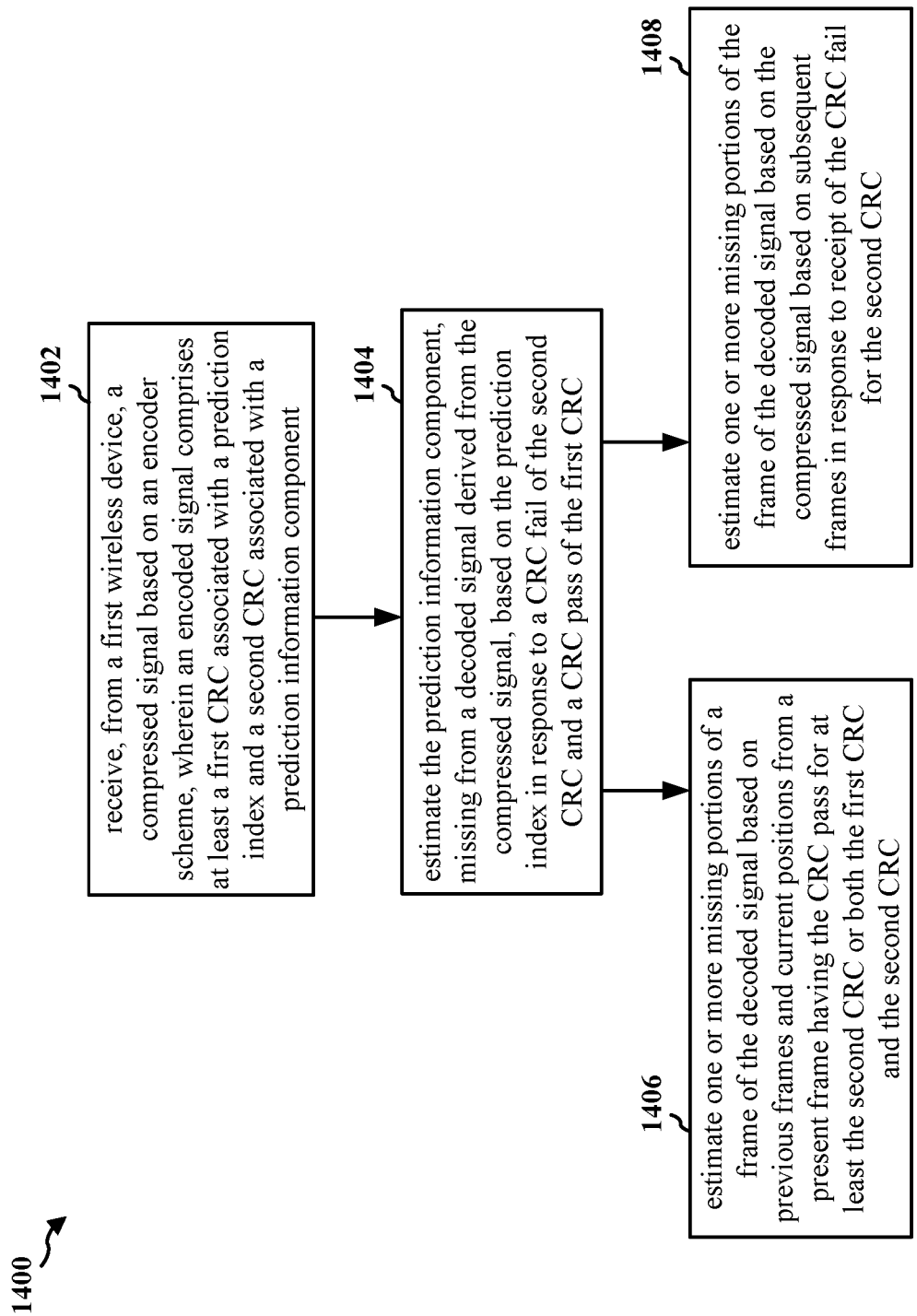
FIG. 14 is a flowchart of a method of wireless communication.

FIG. 14 is a flowchart 1400 of a method of wireless communication at a second wireless device. The method may be performed by a UE (e.g., the UE 104; the apparatus 1504) or may be performed by a network entity (e.g., the base station 102; the network entity 1502, 1602). One or more of the illustrated operations may be omitted, transposed, or contemporaneous. The method may allow for an improved estimation of missing data based at least on a separate CRC for a prediction index.

At 1402, the second wireless device may receive, from a first wireless device, a compressed signal. For example, 1402 may be performed by prediction component 199 of apparatus 1504 or network entity 1502, 1602. The compressed signal may be compressed based on an encoder scheme. The compressed signal may be compressed by the first wireless device based on the encoder scheme to generate an encoded signal. The encoded signal may comprise at least a first CRC associated with a prediction index and a second CRC associated with a prediction information component. In some aspects, the first CRC associated with the prediction index may be in a different code block than the second CRC associated with the prediction information component. In some aspects, the first CRC associated with the prediction index may be in a same code block of the second CRC associated with the prediction information component. In some aspects, the first CRC and the second CRC may be comprised in a distributed CRC. The first CRC corresponding to a first portion of the distributed CRC may provide protection for a first portion of a code block comprising the prediction index. The second CRC corresponding to a second portion of the distributed CRC may provide protection for a second portion of the code block comprising the prediction information component.

At 1404, the second wireless device may estimate the prediction information component, missing from a decoded signal derived from the compressed signal, based on the prediction index. For example, 1404 may be performed by prediction component 199 of apparatus 1504 or network entity 1502, 1602. The second wireless device may estimate the prediction information component, missing from the decoded signal derived from the compressed signal, based on the prediction index in response to a CRC fail of the second CRC and a CRC pass of the first CRC. In some aspects, the prediction index may identify a prediction scheme utilized by the first wireless device in the encoder scheme. The prediction information component may correspond to a difference between a frame of the encoded signal and a prediction of the frame of the encoded signal.

At 1406, the second wireless device may estimate one or more missing portions of a frame of the decoded signal. For example, 1406 may be performed by prediction component 199 of apparatus 1504 or network entity 1502, 1602. The second wireless device may estimate the one or more missing portions of the frame of the decoded signal based on previous frames and current positions from a present frame having the CRC pass for at least the second CRC or both the first CRC and the second CRC.

At 1408, the second wireless device may estimate one or more missing portions of the frame of the decoded signal based on the compressed signal based on subsequent frames in response to receipt of the CRC fail for the second CRC. For example, 1408 may be performed by prediction component 199 of apparatus 1504 or network entity 1502, 1602. In some aspects, the compressed signal, received from the first wireless device, may comprise one or more parity bits. The one or more parity bits may correspond to a difference between a frame of the compressed signal and at least one subsequent frame of the compressed signal. In some aspects, the encoder scheme utilized to generate the compressed signal may comprise a DVC scheme.

Figure 15:
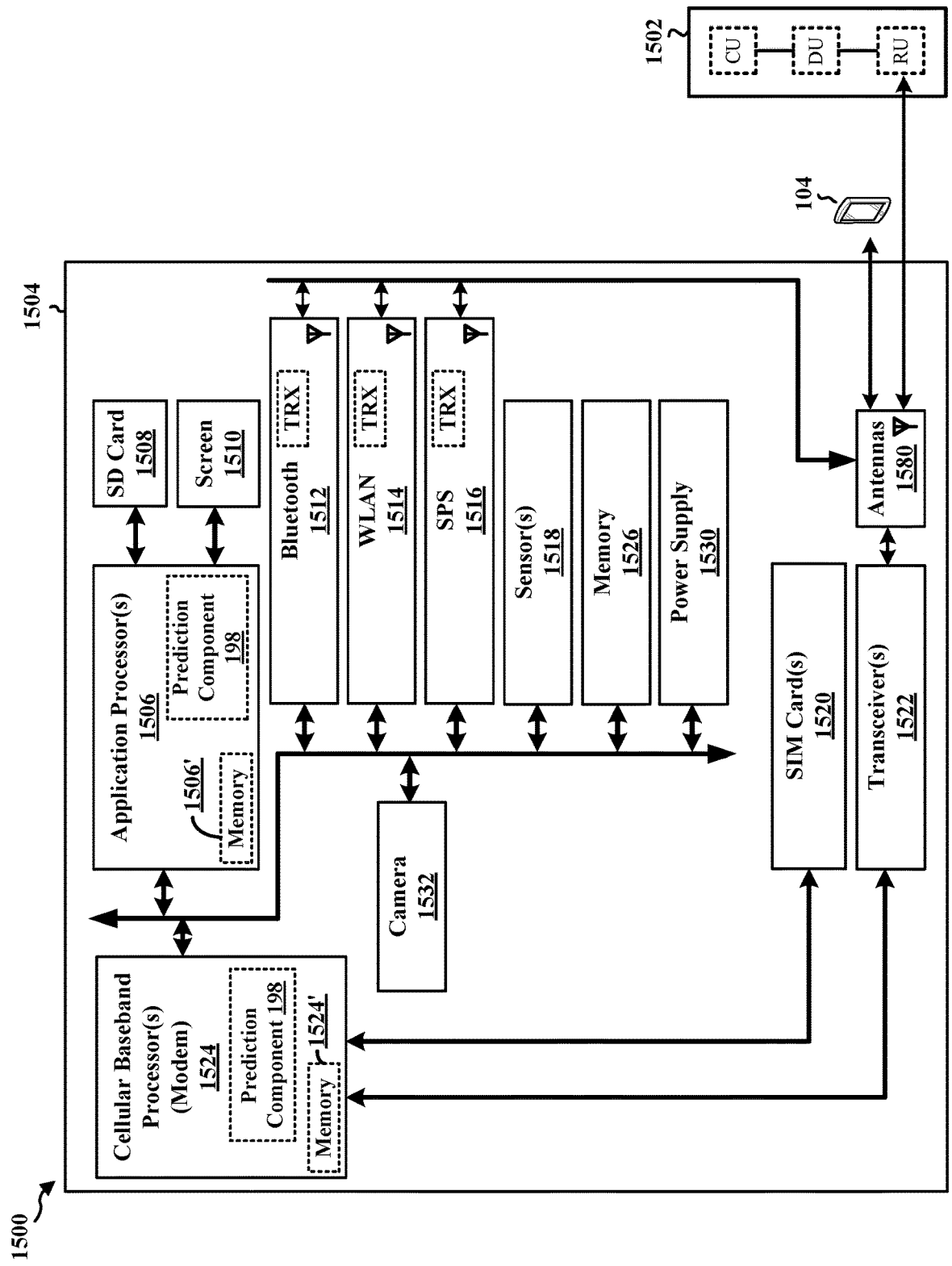
FIG. 15 is a diagram illustrating an example of a hardware implementation for an example network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

Figure 16:
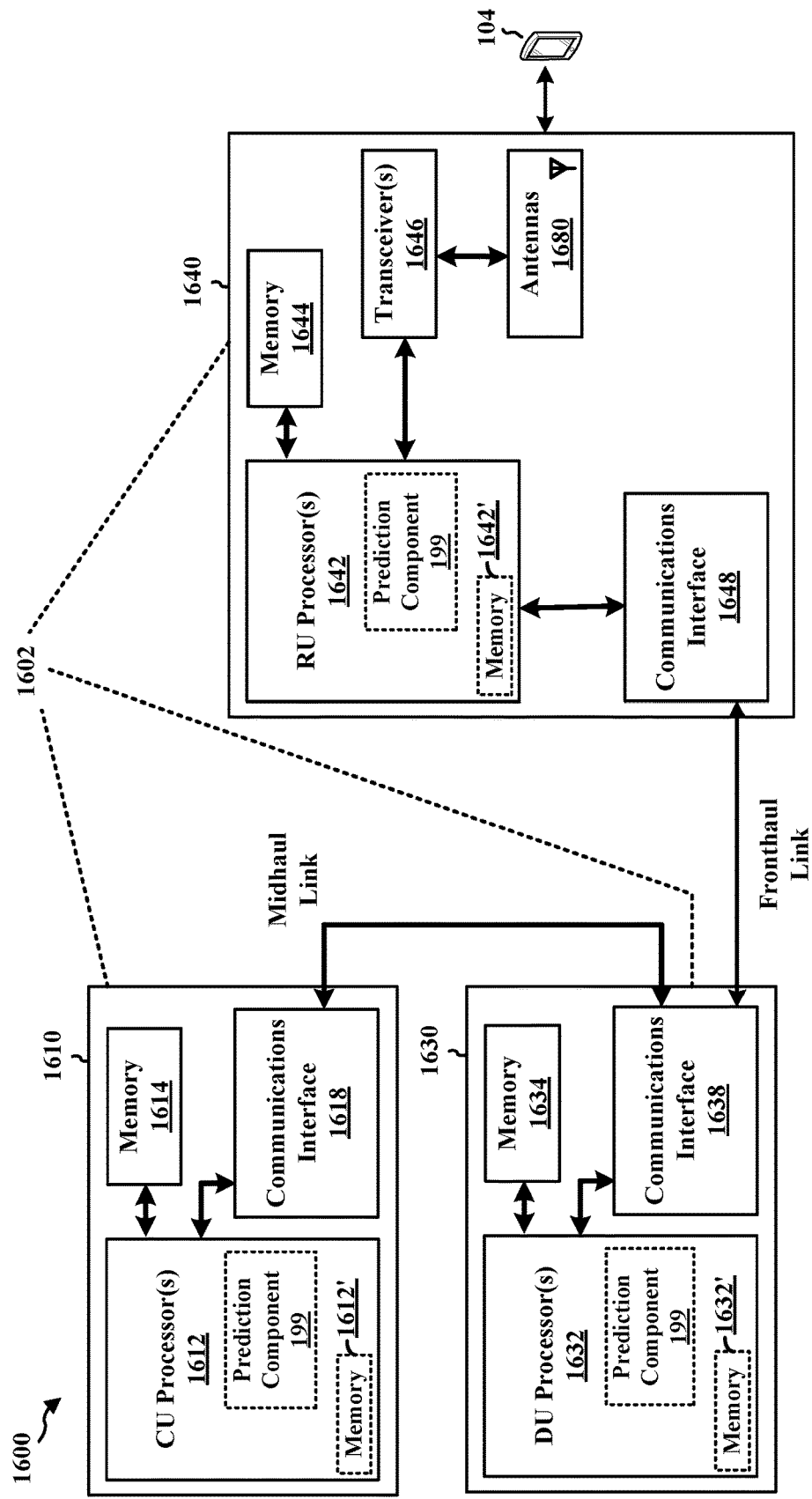
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a first wireless device, a compressed signal based on an encoder scheme, wherein an encoded signal comprises at least a first CRC associated with a prediction index and a second CRC associated with a prediction information component; and estimate the prediction information component, missing from a decoded signal derived from the compressed signal, based on the prediction index in response to a CRC fail of the second CRC and a CRC pass of the first CRC. In some aspects, the component 199 may be within the cellular baseband processor(s) 1524, the application processor(s) 1506, or both the cellular baseband processor(s) 1524 and the application processor(s) 1506. In some aspects, the component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for receiving, from a first wireless device, a compressed signal based on an encoder scheme, wherein an encoded signal comprises at least a first CRC associated with a prediction index and a second CRC associated with a prediction information component. The apparatus includes means for estimating the prediction information component, missing from a decoded signal derived from the compressed signal, based on the prediction index in response to a CRC fail of the second CRC and a CRC pass of the first CRC. The apparatus further includes means for estimating one or more missing portions of a frame of the decoded signal based on previous frames and current positions from a present frame having the CRC pass for at least the second CRC or both the first CRC and the second CRC. The apparatus further includes means for estimating one or more missing portions of the frame of the decoded signal based on the compressed signal based on subsequent frames in response to receipt of the CRC fail for the second CRC. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

The network entity 1602 may include a variety of components configured for various functions. In one configuration, the network entity 1602 may include means for receiving, from a first wireless device, a compressed signal based on an encoder scheme, wherein an encoded signal comprises at least a first CRC associated with a prediction index and a second CRC associated with a prediction information component. The network entity includes means for estimating the prediction information component, missing from a decoded signal derived from the compressed signal, based on the prediction index in response to a CRC fail of the second CRC and a CRC pass of the first CRC. The network entity further includes means for estimating one or more missing portions of a frame of the decoded signal based on previous frames and current positions from a present frame having the CRC pass for at least the second CRC or both the first CRC and the second CRC. The network entity further includes means for estimating one or more missing portions of the frame of the decoded signal based on the compressed signal based on subsequent frames in response to receipt of the CRC fail for the second CRC. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device comprising compressing a signal based on an encoder scheme, wherein an encoded signal comprises at least a first CRC associated with a prediction index and a second CRC associated with a prediction information component; and transmitting, to a second wireless device, the encoded signal comprising at least the first CRC associated with the prediction index and the second CRC associated with the prediction information component.

Aspect 2 is the method of aspect 1, further includes that the prediction index identifies a prediction scheme utilized in the encoder scheme, wherein the prediction information component corresponds to a difference between a frame of the encoded signal and a prediction of the frame of the encoded signal.

Aspect 3 is the method of any of aspects 1 and 2, further includes that the first CRC associated with the prediction index is in a different code block than the second CRC associated with the prediction information component or is in a same code block of the second CRC associated with the prediction information component.

Aspect 4 is the method of any of aspects 1-3, further includes that the first CRC and the second CRC are comprised in a distributed CRC, the first CRC corresponding to a first portion of the distributed CRC that provides protection for a first portion of a code block comprising the prediction index, and the second CRC corresponding to a second portion of the distributed CRC that provides protection for a second portion of the code block comprising the prediction information component.

Aspect 5 is the method of any of aspects 1-4, further includes that the encoded signal comprises one or more parity bits, wherein the one or more parity bits correspond to a difference between a frame of the encoded signal and at least one subsequent frame of the encoded signal.

Aspect 6 is the method of any of aspects 1-5, further includes that the encoder scheme utilized to compress the encoded signal comprises a DVC scheme.

Aspect 7 is an apparatus for wireless communication at a first wireless device including at least one processor coupled to a memory and at least one transceiver, the at least one processor configured to implement any of Aspects 1-6.

Aspect 8 is an apparatus for wireless communication at a first wireless device including means for implementing any of Aspects 1-6.

Aspect 9 is a computer-readable medium storing computer executable code, where the code when executed by a processor causes the processor to implement any of Aspects 1-6.

Aspect 10 is a method of wireless communication at a second wireless device comprising receiving, from a first wireless device, a compressed signal based on an encoder scheme, wherein an encoded signal comprises at least a first CRC associated with a prediction index and a second CRC associated with a prediction information component; and estimate the prediction information component, missing from a decoded signal derived from the compressed signal, based on the prediction index in response to a CRC fail of the second CRC and a CRC pass of the first CRC.

Aspect 11 is the method of aspect 10, further includes that the prediction index identifies a prediction scheme utilized by the first wireless device in the encoder scheme, wherein the prediction information component corresponds to a difference between a frame of the encoded signal and a prediction of the frame of the encoded signal.

Aspect 12 is the method of aspects 10 and 11, further includes that the first CRC associated with the prediction index is in a different code block than the second CRC associated with the prediction information component or is in a same code block of the second CRC associated with the prediction information component.

Aspect 13 is the method of any of aspects 10-12, further includes that the first CRC and the second CRC are comprised in a distributed CRC, the first CRC corresponding to a first portion of the distributed CRC that provides protection for a first portion of a code block comprising the prediction index, and the second CRC corresponding to a second portion of the distributed CRC that provides protection for a second portion of the code block comprising the prediction information component.

Aspect 14 is the method of any of aspects 10-13, further including estimating one or more missing portions of a frame of the decoded signal based on previous frames and current positions from a present frame having the CRC pass for at least the second CRC or both the first CRC and the second CRC.

Aspect 15 is the method of any of aspects 10-14, further includes that the compressed signal, received from the first wireless device, comprises one or more parity bits, wherein the one or more parity bits correspond to a difference between a frame of the compressed signal and at least one subsequent frame of the compressed signal, wherein the encoder scheme utilized to generate the compressed signal comprises a DVC scheme.

Aspect 16 is the method of any of aspects 10-15, further including estimating one or more missing portions of the frame of the decoded signal based on the compressed signal based on subsequent frames in response to receipt of the CRC fail for the second CRC.

Aspect 17 is an apparatus for wireless communication at a UE including at least one processor coupled to a memory and at least one transceiver, the at least one processor configured to implement any of Aspects 10-16.

Aspect 18 is an apparatus for wireless communication at a UE including means for implementing any of Aspects 10-16.

Aspect 19 is a computer-readable medium storing computer executable code, where the code when executed by a processor causes the processor to implement any of Aspects 10-16.

What is claimed is:
1. An apparatus for wireless communication at a first wireless device, comprising:
at least one memory; and
at least one processor coupled to the at least one memory and, based at least in part on information stored in the at least one memory, the at least one processor is configured to cause the apparatus to:
compress a signal based on a prediction index and corresponding prediction information to generate an encoded signal, wherein the encoded signal comprises first cyclic redundancy check (CRC) information with the prediction index and second CRC information with the corresponding prediction information, wherein the prediction index identifies a prediction scheme, and the corresponding prediction information is based on the prediction scheme indicated by the prediction index; and
transmit, to a second wireless device, the encoded signal comprising the first CRC information with the prediction index and the second CRC information with the prediction information.

2. The apparatus of claim 1, further comprising a transceiver coupled to the at least one processor, the transceiver being configured to:
  transmit, to the second wireless device, the encoded signal comprising at least the first CRC information with the prediction index and the second CRC information with the prediction information.

3. The apparatus of claim 1, wherein the prediction information corresponds to a difference between a frame of the encoded signal and a prediction of the frame of the encoded signal.

4. The apparatus of claim 1, wherein the first CRC information with the prediction index is in a different code block than the second CRC information with the prediction information or is in a same code block of the second CRC information with the prediction information.

5. The apparatus of claim 1, wherein the first CRC information and the second CRC information are comprised in distributed CRC information, the first CRC information corresponding to a first portion of the distributed CRC information that provides protection for a first portion of a code block comprising the prediction index, and the second CRC information corresponding to a second portion of the distributed CRC information that provides protection for a second portion of the code block comprising the prediction information.

6. The apparatus of claim 1, wherein the encoded signal comprises one or more parity bits, wherein the one or more parity bits correspond to a difference between a frame of the encoded signal and at least one subsequent frame of the encoded signal.

7. The apparatus of claim 6, wherein an encoder scheme utilized to compress the encoded signal comprises a distributed video coding (DVC) scheme.

8. A method of wireless communication at a first wireless device, comprising:
  compressing a signal based on a prediction index and corresponding prediction information to generate an encoded signal, wherein the encoded signal comprises first cyclic redundancy check (CRC) information with the prediction index and second CRC information with the corresponding prediction information, wherein the prediction index identifies a prediction scheme, and the prediction information is based on the prediction scheme indicated by the prediction index; and
  transmitting, to a second wireless device, the encoded signal comprising the first CRC information with the prediction index and the second CRC information with the prediction information.

9. The method of claim 8, wherein the prediction information corresponds to a difference between a frame of the encoded signal and a prediction of the frame of the encoded signal.

10. The method of claim 8, wherein the first CRC information with the prediction index is in a different code block than the second CRC information with the prediction information or is in a same code block of the second CRC information with the prediction information.

11. The method of claim 8, wherein the first CRC information and the second CRC information are comprised in distributed CRC information, the first CRC information corresponding to a first portion of the distributed CRC information that provides protection for a first portion of a code block comprising the prediction index, and the second CRC information corresponding to a second portion of the distributed CRC information that provides protection for a second portion of the code block comprising the prediction information.

12. The method of claim 8, wherein the encoded signal comprises one or more parity bits, wherein the one or more parity bits correspond to a difference between a frame of the encoded signal and at least one subsequent frame of the encoded signal.

13. The method of claim 12, wherein an encoder scheme utilized to compress the encoded signal comprises a distributed video coding (DVC) scheme.

14. An apparatus for wireless communication at a second wireless device, comprising:
  at least one memory; and
  at least one processor coupled to the at least one memory and, based at least in part on information stored in the at least one memory, the at least one processor is configured to cause the apparatus to:
    receive, from a first wireless device, an encoded signal including data that is compressed based on a prediction index and corresponding prediction information, wherein the encoded signal comprises at least a first cyclic redundancy check (CRC) information with the prediction index and second CRC information with the corresponding prediction information, wherein the prediction index identifies a prediction scheme, and the corresponding prediction information is based on the prediction scheme indicated by the prediction index;
    perform a first CRC on the first CRC information with the prediction index; and
    estimate the corresponding prediction information from the encoded signal based at least in part on a CRC pass of the first CRC, wherein the estimate is in response to a CRC fail of a second CRC on the second CRC information and the CRC pass of the first CRC.

15. The apparatus of claim 14, further comprising a transceiver coupled to the at least one processor, the transceiver being configured to:
  receive, from the first wireless device, the encoded signal including the data that is compressed based on the prediction index and the corresponding prediction information.

16. The apparatus of claim 14, wherein the prediction information corresponds to a difference between a frame of the encoded signal and a prediction of the frame of the encoded signal.

17. The apparatus of claim 14, wherein the first CRC information with the prediction index is in a different code block than the second CRC information with the prediction information or is in a same code block of the second CRC information with the prediction information.

18. The apparatus of claim 14, wherein the first CRC information and the second CRC information are comprised in distributed CRC information, the first CRC information corresponding to a first portion of the distributed CRC information that provides protection for a first portion of a code block comprising the prediction index, and the second CRC information corresponding to a second portion of the distributed CRC information that provides protection for a second portion of the code block comprising the prediction information.

19. The apparatus of claim 14, wherein the at least one processor is configured to cause the apparatus to:
  estimate one or more missing portions of a frame of a decoded signal based on previous frames and current positions from a present frame having the CRC pass for at least the second CRC or both the first CRC and the second CRC.

20. The apparatus of claim 14, wherein the encoded signal, received from the first wireless device, comprises one or more parity bits, wherein the one or more parity bits correspond to a difference between a frame of the encoded signal and at least one subsequent frame of the encoded signal, wherein an encoder scheme utilized to generate the encoded signal comprises a distributed video coding (DVC) scheme.

21. The apparatus of claim 20, wherein the at least one processor is configured to cause the apparatus to:
estimate one or more missing portions of the frame of a decoded signal based on the encoded signal based on subsequent frames in response to receipt of the CRC fail of the second CRC.

22. A method of wireless communication at a second wireless device, comprising:
receiving, from a first wireless device, an encoded signal including data that is compressed based on a prediction index and corresponding prediction information, wherein the encoded signal comprises at least a first cyclic redundancy check (CRC) information with the prediction index and second CRC information with the corresponding prediction information, wherein the prediction index identifies a prediction scheme, and the corresponding prediction information is based on the prediction scheme indicated by the prediction index;
performing a first CRC on the first CRC information with the prediction index; and
estimating the corresponding prediction information from the encoded signal based at least in part on a CRC pass of the first CRC, wherein the estimate is in response to a CRC fail of a second CRC on the second CRC information and the CRC pass of the first CRC.

23. The method of claim 22, wherein the prediction information corresponds to a difference between a frame of the encoded signal and a prediction of the frame of the encoded signal.

24. The method of claim 22, wherein the first CRC information with the prediction index is in a different code block than the second CRC information with the prediction information or is in a same code block of the second CRC information with the prediction information.

25. The method of claim 22, wherein the first CRC information and the second CRC information are comprised in distributed CRC information, the first CRC information corresponding to a first portion of the distributed CRC information that provides protection for a first portion of a code block comprising the prediction index, and the second CRC information corresponding to a second portion of the distributed CRC information that provides protection for a second portion of the code block comprising the prediction information.

26. The method of claim 22, further comprising:
estimating one or more missing portions of a frame of a decoded signal based on previous frames and current positions from a present frame having the CRC pass for at least the second CRC or both the first CRC and the second CRC.

27. The method of claim 22, wherein the encoded signal, received from the first wireless device, comprises one or more parity bits, wherein the one or more parity bits correspond to a difference between a frame of the encoded signal and at least one subsequent frame of the encoded signal, wherein an encoder scheme utilized to generate the encoded signal comprises a distributed video coding (DVC) scheme.

28. The method of claim 27, further comprising:
estimating one or more missing portions of the frame of a decoded signal based on the encoded signal based on subsequent frames in response to receipt of the CRC fail of the second CRC.

* * * * *